(12) United States Patent
Schlipf et al.

(10) Patent No.: US 8,967,550 B2
(45) Date of Patent: Mar. 3, 2015

(54) AEROFOIL COMPRISING A HIGH LIFT FLAP

(75) Inventors: Bernhard Schlipf, Bremen (DE); Xavier Hue, Bremen (DE)

(73) Assignee: Airbus Operations GmbH, Hamburg (DE)

( * ) Notice: Subject to any disclaimer, the term of this patent is extended or adjusted under 35 U.S.C. 154(b) by 656 days.

(21) Appl. No.: 13/255,276

(22) PCT Filed: Mar. 29, 2010

(86) PCT No.: PCT/EP2010/001984
§ 371 (c)(1),
(2), (4) Date: Nov. 21, 2011

(87) PCT Pub. No.: WO2010/108699
PCT Pub. Date: Sep. 30, 2010

(65) Prior Publication Data
US 2012/0061524 A1 Mar. 15, 2012

Related U.S. Application Data

(60) Provisional application No. 61/164,147, filed on Mar. 27, 2009.

(30) Foreign Application Priority Data

Mar. 27, 2009 (DE) .................... 10 2009 015 330

(51) Int. Cl.
*B64C 9/22* (2006.01)
*B64C 9/02* (2006.01)
*B64C 9/16* (2006.01)

(52) U.S. Cl.
CPC ... *B64C 9/22* (2013.01); *B64C 9/02* (2013.01); *B64C 9/16* (2013.01)
USPC .......... 244/214; 244/215; 244/99.2; 244/99.3

(58) Field of Classification Search
USPC ................................ 244/214, 215, 99.2, 99.3
See application file for complete search history.

(56) References Cited

U.S. PATENT DOCUMENTS 2,973,925 A * 3/1961 Wiele ............................ 244/203
5,681,013 A * 10/1997 Rudolph ........................ 244/214
(Continued)

FOREIGN PATENT DOCUMENTS

DE 103 28 717 12/2004
DE 10 2005 044 549 3/2007
(Continued)

OTHER PUBLICATIONS

International Search Report for Application Serial No. PCT/EP2010/001984 dated Jul. 26, 2010.
International Preliminary Report on Patentability and Written Opinion for Application Serial No. PCT/EP2010/001984 dated Oct. 6, 2011.

*Primary Examiner* — Isam Alsomiri
*Assistant Examiner* — Justin Benedik
(74) *Attorney, Agent, or Firm* — Jenkins, Wilson, Taylor & Hunt, P.A.

(57) ABSTRACT

A wing is provided, including a high-lift flap arranged on the wing such that it is movable by means of at least two adjustment mechanisms arranged side-by-side in the spanwise direction of the wing and adjustable by means of a drive device. Each adjustment mechanism includes a first adjustment lever, articulated on a main wing surface via a first pivotal articulation, with the formation of a first rotation axis; a second adjustment lever, articulated on the high-lift flap via a second pivotal articulation, with the formation of a second rotation axis; and a central articulation, linking together the first and the second adjustment levers, with the formation of a third rotation axis. An intermediate articulated part is arranged on at least one of the adjustment mechanisms for coupling the first adjustment lever and the main wing surface, or for coupling the second adjustment lever and the high-lift flap.

20 Claims, 6 Drawing Sheets

(56) References Cited

U.S. PATENT DOCUMENTS

Figure 1:
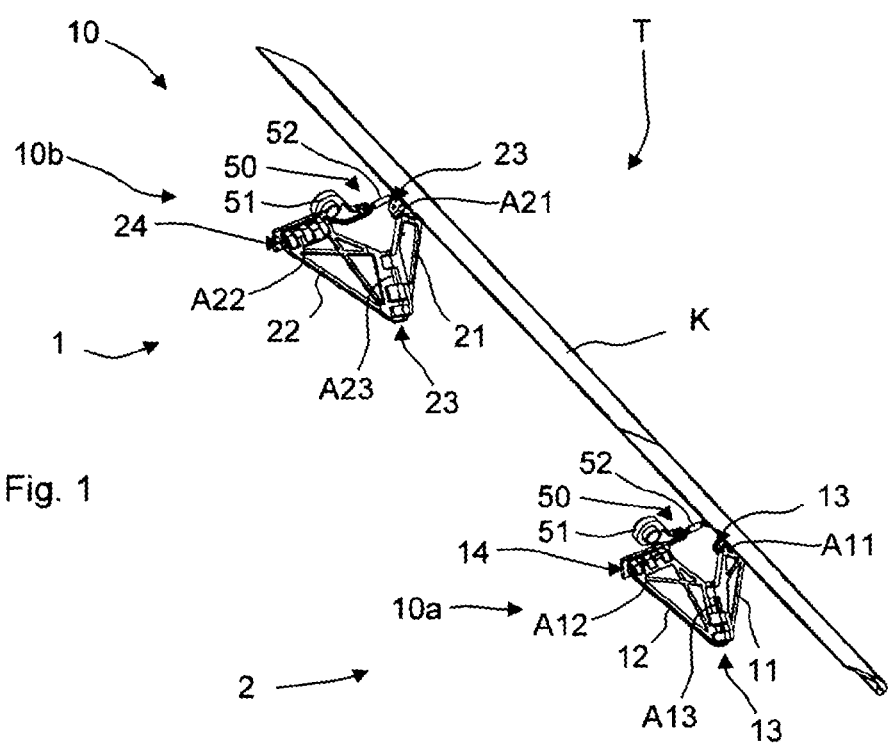

| | | | |
|---|---|---|---|
| 7,063,292 B2 * | 6/2006 | Perez-Sanchez | 244/216 |
| 7,484,694 B2 * | 2/2009 | Perez-Sanchez | 244/214 |
| 7,600,718 B2 * | 10/2009 | Perez-Sanchez | 244/215 |
| 7,861,978 B2 * | 1/2011 | Holert | 244/215 |
| 8,302,913 B2 * | 11/2012 | Schlipf | 244/215 |
| 2005/0116114 A1 * | 6/2005 | Aitchison et al. | 244/207 |
| 2005/0116115 A1 * | 6/2005 | Perez-Sanchez | 244/212 |

FOREIGN PATENT DOCUMENTS

| | | |
|---|---|---|
| EP | 1 764 303 | 3/2007 |
| GB | 2 402 914 | 12/2004 |

\* cited by examiner

AEROFOIL COMPRISING A HIGH LIFT FLAP

RELATED APPLICATIONS

The present application is a national stage entry according to 35 U.S.C. §371 of PCT application No.: PCT/EP2010/001984 filed on 29 Mar. 2010, which claims priority from German Application No.: 10 2009 015 330.6, filed on 27 Mar. 2009, and from U.S. Provisional Application No.: 61/164,147, filed on 27 Mar. 2009, the entire disclosures of which are incorporated herein by reference.

TECHNICAL FIELD

The invention concerns a wing with a main wing surface and a high-lift flap arranged on the latter such that it can move.

BACKGROUND

From DE 10 2005 044 549 B4 a wing with a main wing surface and a high-lift flap is of known art; the latter is arranged on the wing such that it can be moved by means of at least two adjustment mechanisms arranged side-by-side in the spanwise direction of the wing, wherein each of the adjustment mechanisms is constituted from levers connected together in an articulated manner, with the formation of three articulated axes, whose directions meet in a common pole.

SUMMARY

Embodiments of the invention provide a wing with a main wing surface and a high-lift flap arranged on the latter such that it can be moved, whose adjustment device is kinematically optimised.

In accordance with the invention a wing is provided with a main wing surface and a high-lift flap, which is arranged such that it can be moved by means of at least two adjustment mechanisms arranged side-by-side in the spanwise direction of the wing and adjustable by means of a drive device. Each of the adjustment mechanisms has:
  a first adjustment lever, which is articulated on the main wing surface via a first pivotal articulation, with the formation of a first axis of rotation,
  a second adjustment lever, which is articulated on the high-lift flap via a second pivotal articulation, with the formation of a second axis of rotation,
  a central articulation, which connects the first and the second adjustment levers with one another in an articulated manner, with the formation of a third axis of rotation, Here the first, second and third axes of rotation pass through a common pole, which is fixed while the high-lift flap is adjusted with reference to the location of the main wing surface.

In accordance with the invention provision is made that on at least one of the adjustment mechanisms an intermediate articulated part with a base body, and at least a first and a second shaft mounting spaced apart in the transverse direction of the base body, is arranged and designed such that two shaft elements running in the longitudinal direction of the base body, spaced apart from one another in the transverse direction of the base body, are accommodated such that they can rotate.

In accordance with an alternative form of embodiment of the invention provision is made that the intermediate articulated part with the first shaft mounting supports a first shaft element such that it can rotate with the formation of the first axis of rotation, and with the second shaft mounting supports a fourth shaft element such that it can rotate with the formation of a fourth axis of rotation, for purposes of coupling the first adjustment lever and the main wing surface to the intermediate articulated part, wherein an axial separation distance exists between the first axis of rotation and the fourth axis.

Alternatively, provision can be made that the intermediate articulated part, with the first shaft mounting supports a second shaft element such that it can rotate with the formation of the first axis of rotation, and with the second shaft mounting supports a fourth shaft element such that it can rotate with the formation of a fourth axis of rotation, for purposes of coupling the second adjustment lever and the high-lift flap to the intermediate articulated part, with an axial separation distance between the second axis of rotation and the fourth axis.

In these examples of embodiment provision can be made that the base body is constituted in one piece. Alternatively, provision can be made that the base body is constituted in two pieces from two intermediate levers, wherein each of the two intermediate levers has a pair of shaft mountings.

In accordance with one example of embodiment of the invention provision is made that the intermediate articulated part is designed such that the first axis of rotation and the fourth axis of rotation, or the second axis of rotation and the fourth axis of rotation respectively, in each case run parallel to one another.

In accordance with a further example of embodiment in accordance with the invention provision is made that the intermediate articulated part is constituted from a base body and two pairs of shaft mountings thereupon arranged, in each case with a first and a second shaft mounting, in each case for purposes of forming a pivotal bearing with a shaft, wherein the respectively first shaft mounting accommodates a shaft element such that it can rotate to form the first axis of rotation or the second axis of rotation, and wherein the second shaft mounting respectively accommodates shaft elements such that they can rotate to form the fourth axis of rotation respectively, and the first and the second shaft mounting in each case of a pair of shaft mountings are spaced apart from one another in the transverse direction of the intermediate articulated part to form the axial separation distance between the respective axes of rotation.

Here the shaft mountings of the intermediate articulated part can be arranged displaced relative to one another in the longitudinal direction of the intermediate articulated part.

In accordance with a further example of embodiment in accordance with the invention provision is made that the base body of the intermediate articulated part is constituted from two intermediate levers extending in the transverse direction, wherein: the first intermediate lever has a pair of shaft mountings with a first and a second shaft mounting, in each case designed as a spherical bearing, in each case to accommodate a shaft section, in order to couple the intermediate articulated part at a first end to the high-lift flap or the main wing surface, and at a second end to the first adjustment lever or the second adjustment lever, and wherein the second intermediate lever at the first end is connected such that it cannot rotate with the high-lift flap or the main wing surface, and at the second end has a shaft mounting designed as a spherical bearing, with which the second end of the second intermediate lever is coupled with a shaft section of the first adjustment lever or the second adjustment lever.

In accordance with a further example of embodiment in accordance with the invention provision is made that the base body of the intermediate articulated part is constituted from two intermediate levers extending in the transverse direction, wherein: the first intermediate lever has a pair of shaft mountings with a first and a second shaft mounting, in each case designed as a spherical bearing, in each case to accommodate a shaft section, in order to couple the intermediate articulated part at a first end to the first adjustment lever or the second adjustment lever, and at a second end to the high-lift flap or the main wing surface, and wherein the second intermediate lever at the first end is connected such that it cannot rotate with the first adjustment lever or the second adjustment lever, and at the second end has a shaft mounting designed as a spherical bearing, with which the second end of the second intermediate lever is coupled with a shaft section of the high-lift flap or the main wing surface.

in accordance with a further example of embodiment in accordance with the invention provision is made that the base body of the intermediate articulated part is constituted from two intermediate levers extending in the transverse direction, wherein: the first intermediate lever has shaft mountings, spaced apart from one another in the transverse direction, with a first and a second shaft mounting in each case designed as a spherical bearing, in each case to accommodate a shaft section such that it can rotate, wherein the intermediate articulated part at a first end is coupled with a shaft section of the high-lift flap or a shaft section of the main wing surface, and at a second end is coupled with a shaft section of the first adjustment lever or the second adjustment lever, and wherein the second intermediate lever has a pair of shaft mountings, spaced apart from one another in the transverse direction, with at least one first shaft mounting designed as a spherical bearing, and with at least one second shaft mounting designed as a non-spherical bearing, in each case to accommodate a shaft section such that it can rotate, wherein the intermediate articulated part at a first end is coupled with a shaft section of the high-lift flap or a shaft section of the main wing surface, and at a second end is coupled with a shaft section of the first adjustment lever or the second adjustment lever.

Here in particular provision can be made that the second intermediate lever of the intermediate articulated part has shaft mountings spaced apart from one another in the transverse direction, with a first shaft mounting and two second shaft mountings, which in each case are designed as non-spherical bearings and to accommodate a shaft section such that it can rotate, wherein the intermediate articulated part at a first end is coupled with a shaft section of the high-lift flap or a shaft section of the main wing surface, and at a second end is coupled with a shaft section of the first adjustment lever or the second adjustment lever.

Provision can also be made that the second intermediate lever of the intermediate articulated part has shaft mountings spaced apart from one another in the transverse direction, with two first shaft mountings and one second shaft mounting, which in each case are designed as non-spherical bearings and to accommodate a shaft section such that it can rotate, wherein the intermediate articulated part at a first end is coupled with a shaft section of the high-lift flap or a shaft section of the main wing surface, and at a second end is coupled with a shaft section of the first adjustment lever or the second adjustment lever.

The high-lift flap can in particular be a leading-edge flap. Furthermore the leading-edge flap can be a Krüger flap, which in its retracted setting lies against the underside of the main wing surface. The leading-edge flap can also be a slat. Alternatively provision can be made in accordance with the invention that the high-lift flap is a trailing-edge flap.

In accordance with the invention the drive device can be constituted from a linear drive. Alternatively, the drive device can be constituted from a rotary drive.

In accordance with a further example of embodiment in accordance with the invention provision is made that the wing has a stop device for purposes of limiting the maximum extended setting of the high-lift flap, and the stop device is constituted with a stop lever acting between the first and the second adjustment lever, which stop lever is constituted in one piece with the first adjustment lever, or with the second adjustment lever, and as an extension of the same in the direction towards the second axis or the first axis, and is configured such that the free end of the stop lever can be brought into a stop setting with a bearing surface device on the second adjustment lever, or on the first adjustment lever, so as to define the maximum extended setting of the respective adjustment mechanism.

Furthermore in accordance with a further example of embodiment in accordance with the invention provision can be made that the wing has a stop device for purposes of limiting the maximum extended setting of the high-lift flap, and the stop device is constituted with a stop lever to limit the maximum extended setting of the high-lift flap, which is constituted in one piece with the first adjustment lever or with a fitting on the main wing surface, and as an extension of the same in the direction towards the fitting on the main wing surface or the third articulation, and is configured such that the free end of the stop lever can be brought into a stop setting with the fitting on the main wing surface, or the first adjustment lever, so as to define the maximum extended setting of the respective adjustment mechanism.

In accordance with the invention provision can also be made that the wing has a stop device for purposes of limiting the maximum extended setting of the high-lift flap, and the stop device is constituted with a stop lever to limit the maximum extended setting of the high-left flap, which is constituted in one piece with the second adjustment lever or with a fitting on the high-lift flap, and as an extension of the same in the direction towards the fitting on the high-lift flap or the third articulation, and is configured such that the free end of the stop lever can be brought into a stop setting with the fitting on the high-lift flap, or the second adjustment lever, so as to define the maximum extended setting of the respective adjustment mechanism.

The stop device can in particular be embodied such that this device limits a maximum extended setting of the leading-edge flap, whereby the directions of action of the adjustment levers have an angle (alpha) of less than 180 degrees relative to one another. Provision can also be made that a spring device acts together with the stop lever in order to exert a restoring force onto the adjustment mechanism and/or to cushion the arrival at the maximum extended setting of the respective adjustment mechanism.

BREIF DESCRIPTION OF THE DRAWING

Figure 2:
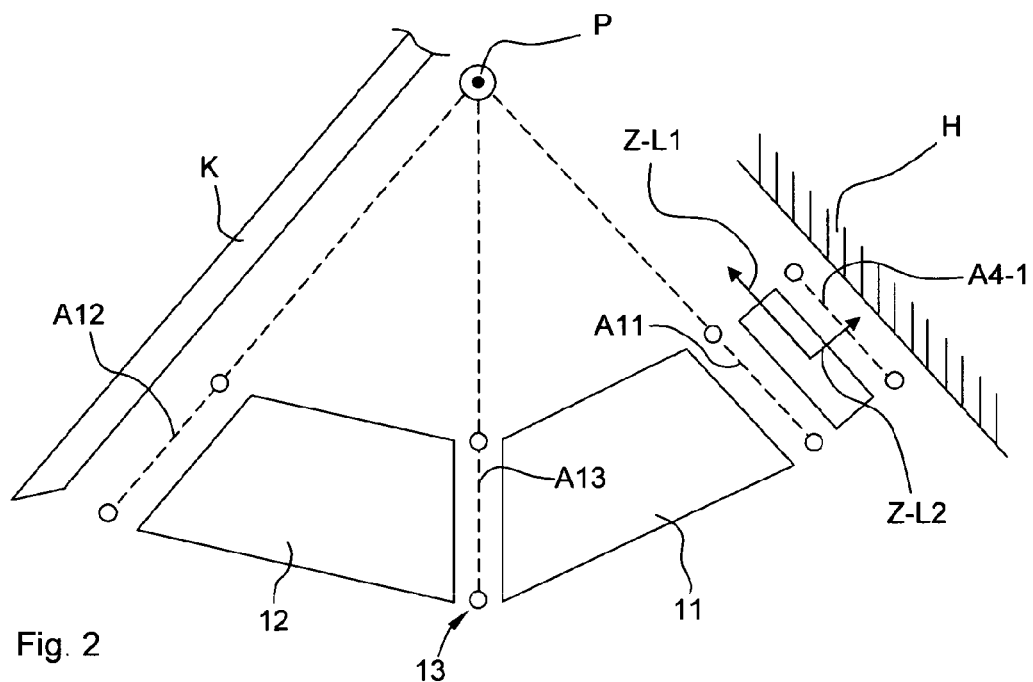

In what follows examples of embodiment of the invention are described with the aid of the accompanying figures, where:

FIG. 1 shows in perspective a schematic representation of an example of embodiment of a high-lift flap to be arranged on a wing in accordance with the invention in the form of a leading-edge flap, which is arranged on the main wing surface such that it can be moved by means of two adjustment mechanisms, wherein in the representation of FIG. 1 the adjustment mechanisms are represented without an intermediate articulated part provided in accordance with the invention, FIG. 2 shows a side view of a schematic representation of an example of embodiment in accordance with the invention of one of the adjustment mechanisms with two levers and an intermediate articulated part in an extended setting, wherein in the example of embodiment represented the intermediate articulated part is articulated by means of two pairs of hinges between an adjustment lever and the main wing surface.

Figure 3:
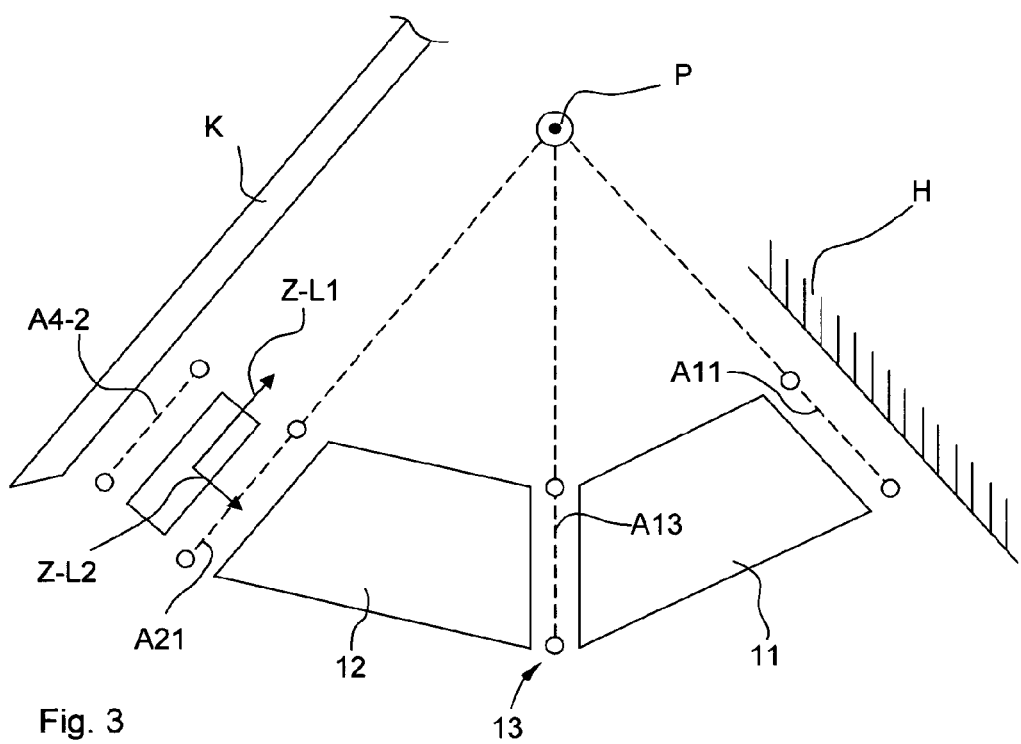
Figure 4:
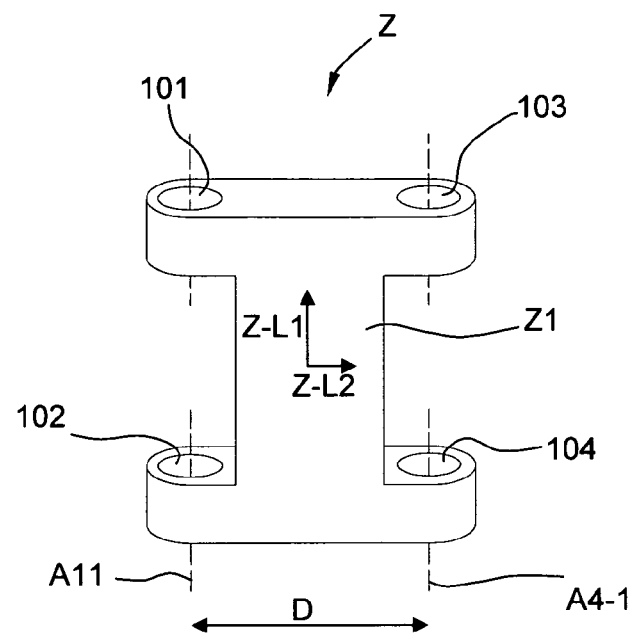
Figure 5:
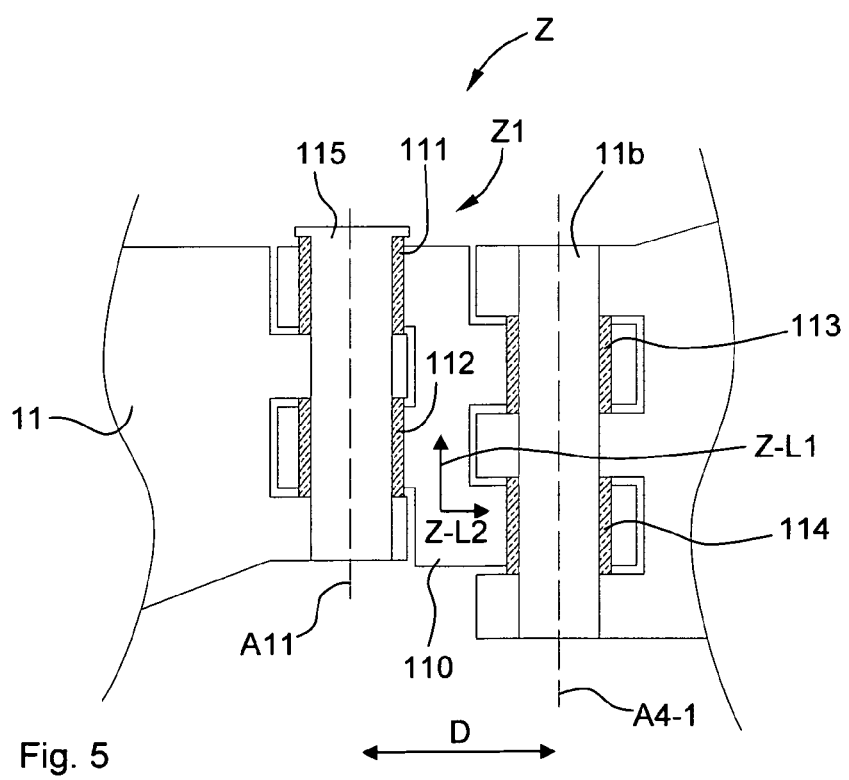
Figure 6:
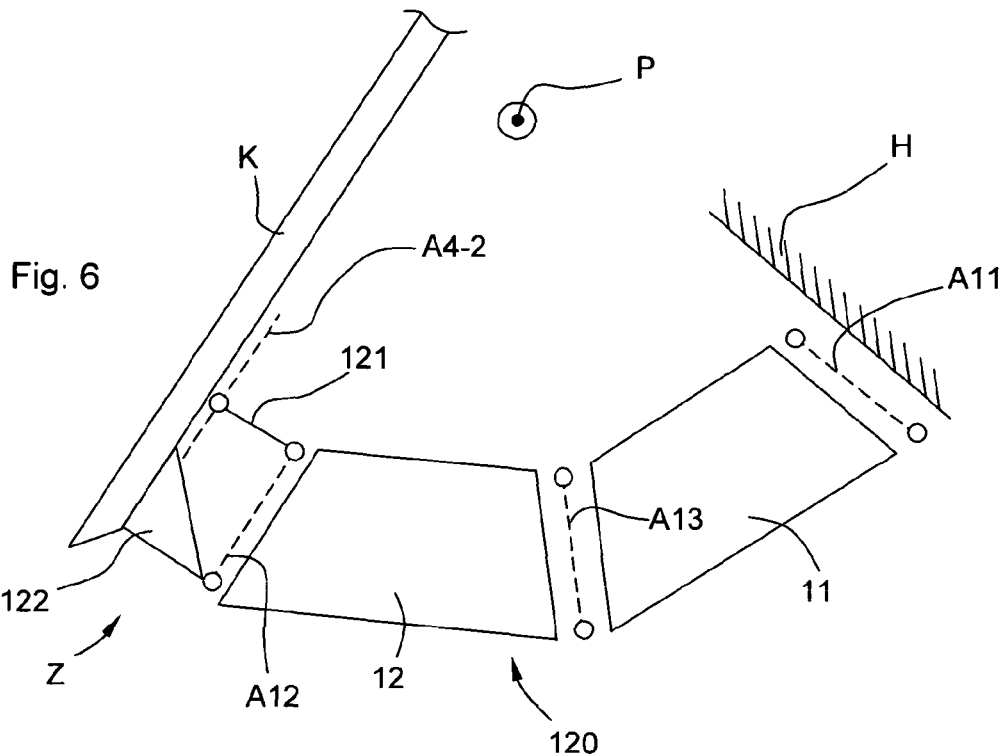

FIG. 3 shows a plan view of a schematic representation of an alternative example of embodiment to that represented in FIG. 2 of one of the adjustment mechanisms in an extended setting, wherein in the example of embodiment represented the intermediate articulated part is articulated by means of two pairs of hinges between an adjustment lever and the high-lift flap, FIG. 4 shows in perspective a schematic representation of an example of embodiment of the intermediate articulated part, which can be used for an adjustment mechanism in accordance with FIG. 2 or 3, FIG. 5 shows in perspective a schematic representation of a further example of embodiment of the intermediate articulated part, which can be used for an adjustment mechanism in accordance with FIG. 2 or 3, FIG. 6 shows a plan view of a schematic representation of an example of embodiment in accordance with the invention of one of the adjustment mechanisms with two levers and an intermediate articulated part in an extended setting, wherein in the example of embodiment represented the intermediate articulated part is articulated by means of two pairs of hinges between an adjustment lever and the high-lift flap, wherein the intermediate articulated part is constituted from a first intermediate lever, which at its end is in each case is coupled via a pivotal articulation with an adjustment lever and the high-lift flap, and a second intermediate lever, which is connected to the high-lift flap such that it cannot rotate, and is coupled with a second end via a pivotal articulation with an adjustment lever.

Figure 7:
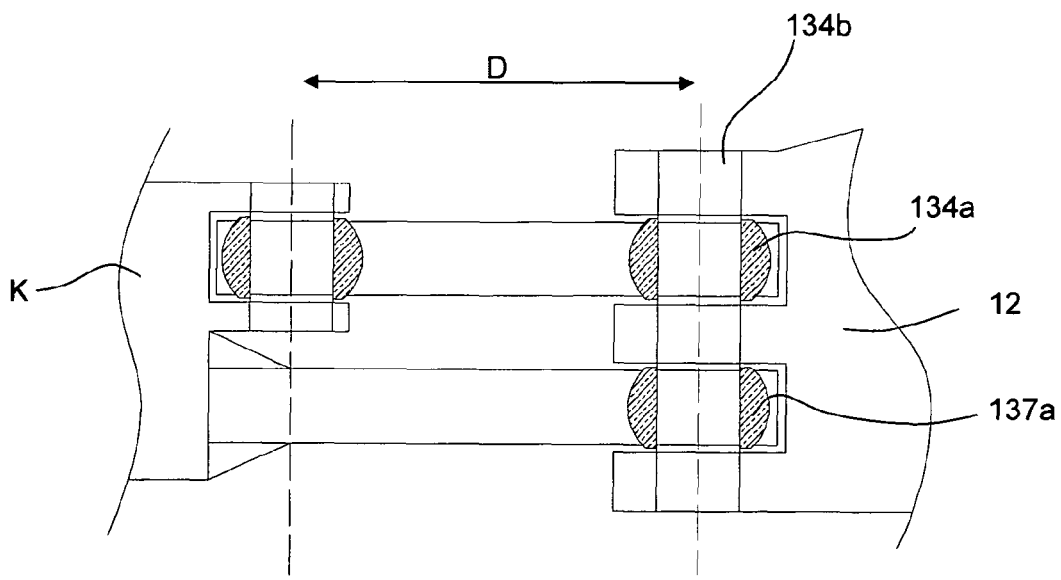
Figure 8:
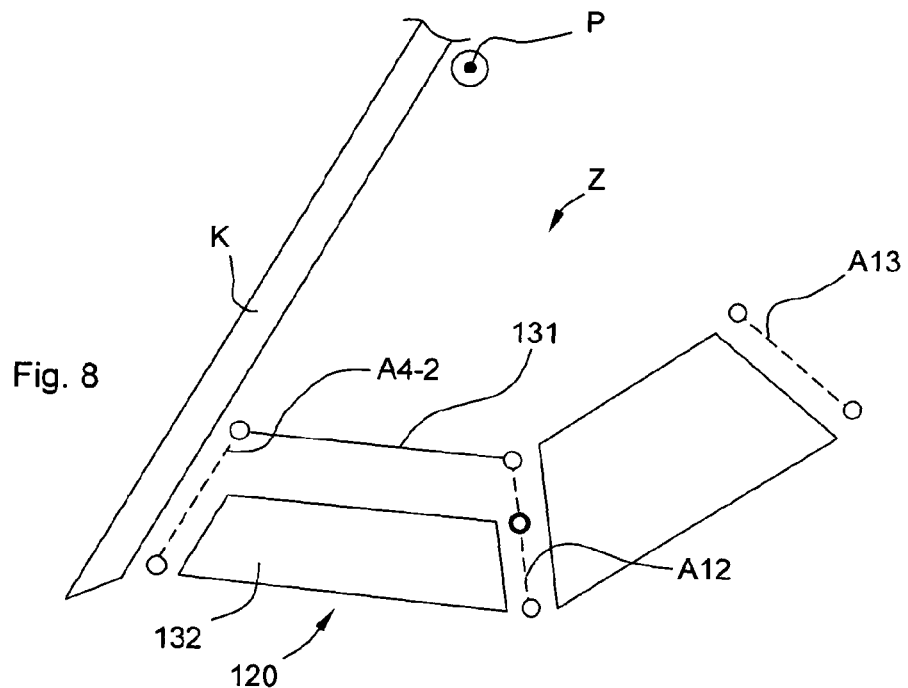
Figure 9:
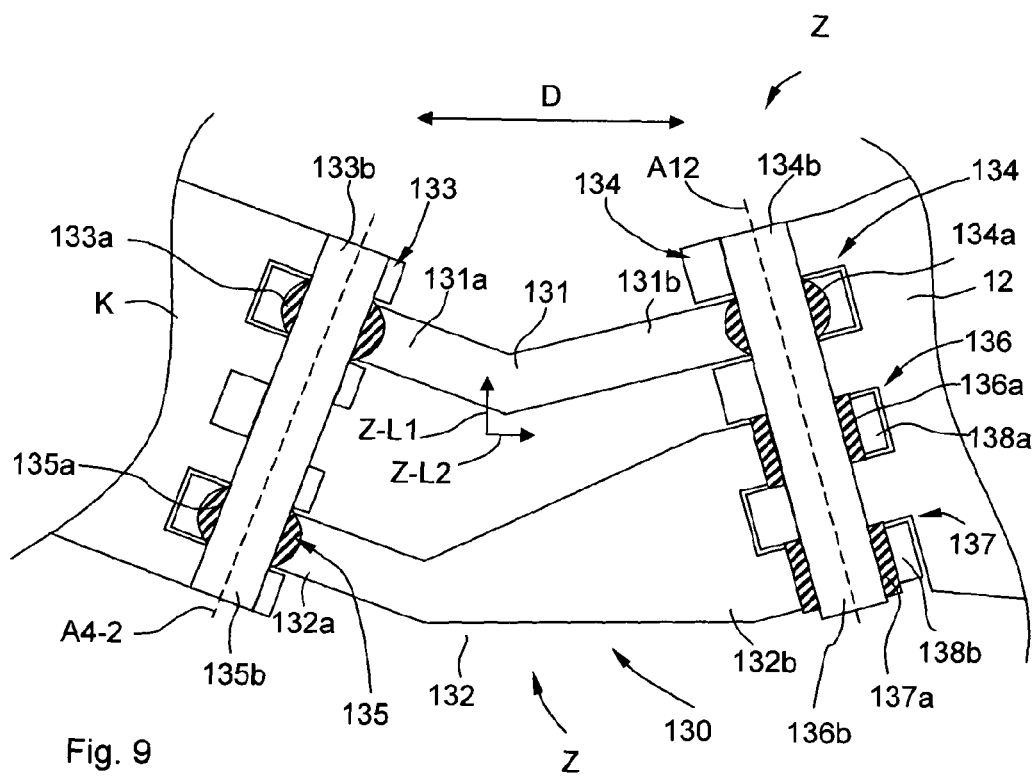
Figure 10:
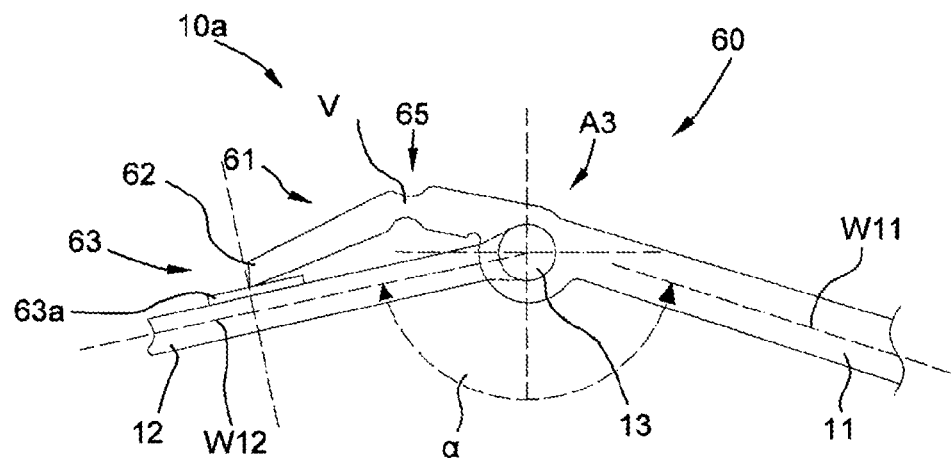
Figure 11:
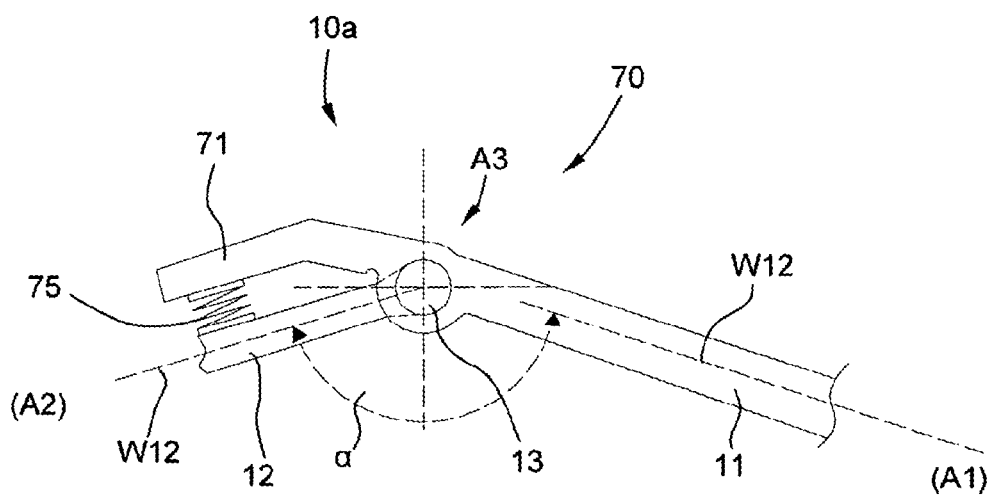

FIG. 7 shows in perspective a schematic representation of an example of embodiment of the intermediate articulated part, which can be used for an adjustment mechanism in accordance with FIG. 6, FIG. 8 shows a plan view of a schematic representation of an example of embodiment in accordance with the invention of one of the adjustment mechanisms with two levers and an intermediate articulated part in an extended setting, wherein in the example of embodiment represented the intermediate articulated part is articulated by means of two pairs of hinges between an adjustment lever and the high-lift flap, wherein the intermediate articulated part is constituted from a first intermediate lever, which at its ends is in each case coupled via a spherical pivotal articulation with an adjustment lever and the high-lift flap, and a second intermediate lever, which is coupled at its first end via a spherical pivotal articulation and at its second end via at least one non-spherical pivotal articulation with an adjustment lever and the high-lift flap, FIG. 9 shows in perspective a schematic representation of an example of embodiment of the intermediate articulated part, which can be used for an adjustment mechanism in accordance with FIG. 8, FIG. 10 shows a representation in cross-section of an example of embodiment of a stop device to limit the maximum extended setting of the leading-edge flap, FIG. 11 shows a representation in cross-section of a further example of embodiment of a stop device to limit the maximum extended setting of the leading-edge flap,

DESCRIPTION

FIG. 1 represents in a schematic manner an example of embodiment of the wing T in accordance with the invention with a main wing surface H of a high-lift flap K. The high-lift flap K is arranged on the main wing surface H by means of an adjustment device 10 with at least two adjustment mechanisms 10a, 10b, which are arranged side-by-side in the spanwise direction H-SW of the main wing surface H, or in the spanwise direction K-SW of the high-lift flap K. In accordance with the invention the high-lift flap K can be a leading-edge flap K1 or a trailing-edge flap.

In FIG. 1 the high-lift flap K is a leading-edge flap K1, which is designed as a slat. In accordance with the invention the leading-edge flap K1 can also be a Krüger flap, which in its retracted setting lies against the underside H1 of the main wing surface H. In FIG. 1 the leading-edge flap K1 is represented in an extended setting. In FIG. 1 two adjustment mechanisms 10a, 10b are represented on the detail represented of the main wing surface H and the leading-edge flap K1 to illustrate the functional principle of the invention. Also incorporated in FIG. 1 is a coordinate system for the main wing surface H with the main wing surface spanwise direction H-SW, the main wing surface chordwise direction H-T, and the main wing surface thickness direction H-D as coordinate axes, and also a coordinate system for the high-lift flap K with the high-lift flap spanwise direction K-SW, the high-lift flap chordwise direction K-T, and the high-lift flap thickness direction K-D as coordinate axes.

The high-lift flap, i.e. the leading-edge flap, is arranged such that it can be moved by means of at least two adjustment mechanisms on the main wing surface between a retracted and an extended setting. In FIG. 1 the leading-edge flap represented is shown in an extended setting, wherein the extended setting represented is not the maximum extended setting of the high lift flap K, i.e. of the leading-edge flap K1.

As can be seen from FIG. 1, the adjustment mechanism 10a of the adjustment device 10 has:
- a first adjustment lever 11, which is articulated on the main wing surface H via a first pivotal articulation 13, with the formation of a first axis of rotation A11, wherein the axis of rotation A11 of the first pivotal articulation 13 runs transversely, or at an angle, to the main wing surface spanwise direction H-SW and the main wing surface chordwise direction H-T,
- a second adjustment lever 12, which is articulated on the high-lift flap K, i.e. the leading-edge flap K1, via a second pivotal articulation 14, with the formation of a second axis of rotation A12, wherein the axis of rotation A12 of the second pivotal articulation 14 runs transversely, or at an angle, to the high-lift flap spanwise direction K-SW and the high-lift flap thickness direction K-D,
- a central articulation 15, which connects the first 11 and the second 12 adjustment levers with one another, with the formation of a third axis of rotation A 13.

In accordance with the invention the directions of the first, second and third axes of rotation A11, A12 and A13 respectively of the first adjustment mechanism 10a meet at a common pole P, which is fixed, i.e. is independent of the high-lift flap K, i.e. of the leading-edge flap K1, while the high-lift flap K is adjusted relative to the location of the main wing surface. By this means the high-lift flap K executes a movement with a circular arc-shaped path relative to the main wing surface H, when the former is moved from its retracted setting into the extended setting, and vice versa.

As can furthermore be seen from FIG. 1, the second adjustment mechanism 10b of the adjustment device 10 has:
- a first adjustment lever 21, which is articulated on the main wing surface H via a first pivotal articulation 23, with the formation of a first axis of rotation A21, wherein the axis of rotation A21 of the first pivotal articulation 23 runs transversely, or at an angle, to the main wing surface spanwise direction H-SW and the main wing surface chordwise direction H-T, a second adjustment lever 22, which is articulated on the high-lift flap K, i.e. the leading-edge flap K1, via a second pivotal articulation 24, with the formation of a second axis of rotation A22, wherein the axis of rotation A22 of the second pivotal articulation 24 runs transversely, or at an angle, to the high-lift flap spanwise direction K-SW and the high-lift flap thickness direction K-D, a central articulation 25, which connects the first 21 and the second 22 adjustment levers with one another, with the formation of a third axis of rotation A23.

In accordance with the invention the directions of the first, second and third axes of rotation A21, A22 and A23 respectively of the second adjustment mechanism 10b meet at a common pole P, which is fixed, i.e. is independent of the high-lift flap K, i.e. of the leading-edge flap K1, while the high-lift flap K is adjusted relative to the location of the main wing surface.

In FIG. 2 the first adjustment mechanism 10a is schematically illustrated in an exemplary manner to illustrate the kinematic concept.

The drive of the adjustment device for its adjustment can be embodied in accordance with the invention in various ways. The drive device 50 can in general be constituted from, e.g. a linear drive or a rotary drive. Here in particular provision can be made that:

the wing T has a drive device 50 with a drive module 51 mounted on the main wing surface H, and, movable with respect to the drive module, a drive lever 52, which is coupled to the high-lift flap K, and the wing T has a stop device 60 to limit the maximum extended setting of the high-lift flap K, i.e. of the leading-edge flap K1.

Alternatively provision can be made that the drive device acts on the adjustment lever and adjusts the latter in order to adjust the adjustment device. Here provision can be made that the drive device is designed as a linear drive, and is coupled to the articulations of the first and second adjustment mechanisms, in order to connect the first and second adjustment levers in each case of an adjustment mechanism with one another in an articulated manner. Provision can also be made that the drive device is designed as a linear drive, and is arranged between two adjustment levers of different adjustment mechanisms 1, 2, and is coupled to the these adjustment levers. By the movement apart and movement together (contraction) of the linear drive of the drive device the two adjustment levers coupled to the linear drive are pushed apart or together, and thereby the adjustment device is moved into a retracted or an extended state. Here the drive device can be coupled between a first adjustment lever of the first adjustment mechanism and a second adjustment lever of the second adjustment mechanism, and vice versa.

In accordance with the invention an intermediate articulated part Z with a base body Z1 is used in at least one adjustment mechanism 10a, 10b of an adjustment device 10. In particular the intermediate articulated part Z is used in just one adjustment mechanism 10a, 10b of an adjustment device 10.

The base body Z1 can be designed in one part or in multiple parts, and thereby in particular in two parts. The base body Z1 has at least one pair of shaft mountings, which as viewed in a transverse direction Z-L2 are arranged spaced apart from one another and are designed such that two shaft elements running in the longitudinal direction Z-L1 of the base body G, running transverse to the transverse direction Z-L2, are accommodated such that they can rotate, spaced apart from one another in the transverse direction of the base body G. The shaft elements are provided, depending upon the example of embodiment of the adjustment mechanism and the arrangement of the intermediate articulated part Z in the same shaft elements, for purposes of connecting the intermediate articulated part Z with the main wing surface H (FIG. 2) or with the high-lift flap (FIG. 2) on one side of the intermediate articulated part Z, and with the first 11, 21, or second 12, 22 adjustment lever on the other side of the intermediate articulated part Z. In this manner an intermediate articulated part Z in accordance with the invention is provided between the second adjustment lever 12, and the high-lift flap K, or between the first adjustment lever 11 and the main wing aerofoil H.

Based on such an arrangement the intermediate articulated part Z thereby supports with at least a first shaft mounting a first shaft element respectively such that it can rotate with the formation of the first axis of rotation A11, A 21, and with the second shaft mounting a fourth shaft element with the formation of a fourth axis of rotation A4-1, for purposes of coupling the first adjustment lever 11, 21 and the main wing surface H to the intermediate articulated part Z with an axial separation distance D between the first axis of rotation A11, A21 and the fourth axis A4-1. Alternatively, based on such an arrangement the intermediate articulated part Z with the first shaft mounting supports a second shaft element with the formation of the second axis of rotation A12, A22, and with the second shaft mounting supports a fourth shaft element with the formation of a fourth axis of rotation A4-2, for purposes of coupling the second adjustment lever 12, 22 and the high-lift flap K to the intermediate articulated part Z with an axial separation distance D between the second axis of rotation A12, A22, and the fourth axis A4-2. Here the intermediate articulated part Z is designed such that the first axis of rotation A11, A21 and the fourth axis of rotation A4-1, or the second axis of rotation A12, A22 and the fourth axis of rotation A4-2 respectively, in each case run parallel to one another.

FIG. 4 represents an example of embodiment of the intermediate articulated part Z provided in accordance with the invention, which is constituted from a base body Z1, and arranged thereupon a first pair of shaft mountings 101, 103, and a second pair of shaft mountings 102, 104. Each pair of shaft mountings thus has a first 101, 102 respectively and a second shaft mounting 103, 104 respectively, in each case for purposes of forming a pivotal bearing with a shaft (not shown in FIG. 4). With reference to the longitudinal direction Z-L1 the first and second shaft mountings are located on opposite sides of the base body Z1. Depending upon the arrangement of the intermediate articulated part Z in an adjustment mechanism 10a, 10b the first shaft mountings 101, 102 respectively accommodate a shaft element such that it can rotate to form the first axis of rotation A11, A21, or the second axis of rotation A 12, A 22. In the representation of FIG. 4 a form of embodiment is represented in which the first shaft mountings 101, 102 accommodate a shaft element to form the first axis of rotation A11. In this example of embodiment provision is furthermore made that the second shaft mountings respectively accommodate shaft elements such that they can rotate to form the fourth axis of rotation A4-1 or A4-2 respectively (depending upon the arrangement in the adjustment mechanism). In the representation of FIG. 4 a form of embodiment is represented in which the second shaft mountings 103, 104 are provided to accommodate a shaft element to form the fourth axis of rotation A4-1 for purposes of coupling the intermediate articulated part Z with the main wing surface H.

The first and the second shaft mountings respectively of a pair of shaft mountings are spaced apart from one another in the transverse direction of the intermediate articulated part Z to form the axial separation distance (D) between the respective axes of rotation (FIG. 4). In the example of embodiment represented in FIG. 4 the shaft mountings are designed as hinge bearings, in particular, that is to say, as non-spherical bearings.

In accordance with a further example of embodiment the shaft mountings of the intermediate articulated part Z can thereby be arranged displaced relative to one another in the longitudinal direction of the same (FIG. 5). FIG. 5 shows an intermediate articulated part Z, which is coupled onto the main wing surface H and a first adjustment lever 11. The first shaft mountings 111, 112 couple the intermediate articulated part Z with the main wing surface H and the second shaft mountings 113, 114 couple the intermediate articulated part Z with the first adjustment lever 11. As viewed in the longitudinal direction Z-L1 of the intermediate articulated part Z the first 111 or 112 and second shaft mountings 113 and/or 114 of a shaft mounting pair in each case are arranged displaced relative to one another. Here, as viewed in the longitudinal direction Z-L1 of the intermediate articulated part Z, a second shaft mounting 113 is located between the two first shaft mountings 111, 112, and a first shaft mounting 112 is located between the two second shaft mountings 113, 114. Compared with the form of embodiment of FIG. 1, by this means a space-saving form of construction of the intermediate articulated part Z can be achieved with the strength required for the same. In the example of embodiment of FIG. 5 a shaft section 115 is mounted such that it can rotate with the shaft mountings or pivotal bearings 111 and 112, and a shaft section 116 is mounted such that it can rotate with the shaft mountings or pivotal bearings 113 and 114.

In the forms of embodiment of FIGS. 4 and 5 the shaft mountings are configured and arranged such that the shaft sections that are mounted in them have axes of rotation that run parallel to one another. Alternatively the shaft mountings can be configured and arranged such that the shaft sections that are mounted in them have axes of rotation that run at an angle, that is to say not parallel, to one another.

In the examples of embodiment represented in FIGS. 4 and 5 the shaft mountings are designed as hinge bearings, in particular, that is to say, as non-spherical bearings.

FIG. 6 shows a schematic representation of a further example of embodiment in accordance with the invention of one of the adjustment mechanisms with two adjustment levers 11, 12 and an intermediate articulated part Z in the embodiment 120 with two intermediate levers 121, 122. In the example of embodiment represented the intermediate articulated part 120 is articulated by means of two pairs of hinges between an adjustment lever 12 and the high-lift flap K. Here the intermediate articulated part 120 is constituted from a first intermediate lever 121, which at its ends is coupled in each case via a pivotal articulation 123, 124 with a second adjustment lever 12 and the high-lift flap K, and a second intermediate lever 122, which at a first end 122a is connected with the high-lift flap K such that it cannot rotate, and with a second end 122b is coupled via a pivotal articulation 126 with an adjustment lever 12.

FIG. 7 shows in perspective a schematic representation of an example of embodiment 120 of the intermediate articulated part, which can be used for an adjustment mechanism in accordance with FIG. 6. In the example of embodiment of FIG. 7 the first intermediate lever 121 has at its first end 121a a first shaft mounting 123a for purposes of forming a first pivotal articulation 123 with a shaft section 123b arranged on the high-lift flap K. Furthermore the first intermediate lever 121 has at its second end 121b a second shaft mounting 124a for purposes of forming a second pivotal articulation 124 with a shaft section 124b arranged on a second adjustment lever 12. Furthermore in the example of embodiment of FIG. 7 the second intermediate lever 122 has at its second end 122b a second shaft mounting 126a for purposes of forming a pivotal articulation 126 with a shaft section 126b arranged on a second adjustment lever 12.

The pivotal articulations 123, 124, 126 can in particular be designed as spherical pivotal bearings. In this manner by means of the intermediate articulated part 120 an additional degree of freedom can be kinematically provided with respect to the mounting of the adjustment mechanisms of an adjustment device, by means of which the constraining forces in the adjustment device, as a result of the deformation of the main wing surface and/or of the high-lift flap K in the event of the occurrence of external forces, or as a result of the forces occurring during the adjustment of the adjustment device by means of the drive device, can be minimised. By this means the structural parts of the adjustment device in accordance with the invention, and/or of the wing T in accordance with the invention, can be designed in a more advantageous manner. This effect also occurs in the further examples of embodiment in accordance with the invention.

In an analogous manner the example of embodiment of an intermediate articulated part Z and/or 120 represented in FIGS. 6 and 7 can also be arranged between the first lever and the main wing surface H.

FIG. 8 shows a plan view of a schematic representation of a further example of embodiment in accordance with the invention of a first 10a of the adjustment mechanisms 10a, 10b with of a second adjustment lever 12 and an intermediate articulated part Z1 in an extended setting. In the example of embodiment represented the intermediate articulated part Z1 is articulated by means of two pairs of hinges between the second adjustment lever 12, and the high-lift flap K, wherein the intermediate articulated part is constituted from a first intermediate lever 131, which at its ends 131a, 131b is coupled in each case via a spherical pivotal articulation with an adjustment lever and the high-lift flap, and from a second intermediate lever 132, which at its ends 132a, 132b is coupled in each case via at least one pivotal articulation with an adjustment lever 12 and the high-lift flap K. The second intermediate lever 132 has at its first end 132a a spherical bearing 135, and at its second end 132b a non-spherical bearing, in each case to couple the second intermediate lever 132 to a shaft section. FIG. 9 shows in perspective a schematic representation of an example of embodiment 130 of the intermediate articulated part Z, which can be used for an adjustment mechanism in accordance with FIG. 8.

In the example of embodiment of FIG. 9 the first intermediate lever 131 has at its first end 131a a first shaft mounting 133a for purposes of forming a first pivotal articulation 133 with a shaft section 133b arranged on the high-lift flap K. Furthermore the first intermediate lever 131 has at its second end 131b a second shaft mounting 134a for purposes of forming a second pivotal articulation 134 with a shaft section 134b arranged on a second adjustment lever 12. The pivotal articulations 133 and 134 are in each case designed as spherical bearings. In the example of embodiment of FIG. 9 the second intermediate lever 132 furthermore has at its first end 135a a first shaft mounting 135a for purposes of forming a first pivotal articulation 135 with a shaft section 135b arranged on the high-lift flap K. The pivotal articulation 135 is designed as a spherical bearing. Furthermore the second intermediate lever 132 has at its second end 137b two second shaft mountings 136a, 137a for purposes of forming in each case second pivotal articulations 136, 137 with a shaft section 136b arranged on a second adjustment lever 12. The two second shaft mountings 136a, 137a are arranged spaced apart from one another in the axial direction of the shaft section 136b, which they accommodate. In particular the second end can be designed in the shape of a fork with two fork parts 138a, 138b, wherein a shaft mounting 136a, 137a respectively, is in each case arranged on a fork part 138a, 138b. Provision can be made that the shaft mountings 136a, 138b, and in particular the shaft mountings 134, 138a, 137a accommodate in each case a one-piece shaft section 134b, 136b. The pivotal articulations 136 and 137 are in each case designed as hinge bearings, or as non-spherical bearings.

By the design of the pivotal articulations 133, 134 as spherical pivotal bearings an additional degree of freedom can be provided by means of the intermediate articulated part 130 with respect to the mounting of the adjustment mechanisms of an adjustment device, by means of which the constraining forces in the adjustment device, as a result of the deformation of the main wing surface and/or of the high-lift flap K in the event of the occurrence of external forces, or as a result of the forces occurring during the adjustment of the adjustment device by means of the drive device, can be minimised. By this means the structural parts of the adjustment device in accordance with the invention and/or of the wing T in accordance with the invention, can be designed in a more advantageous manner.

In an analogous manner the example of embodiment of an intermediate articulated part Z and/or 130 represented in FIGS. 6 and 9 can also be arranged between the first lever and the main wing surface H.

The shaft sections forming an axis of rotation on one articulation side of the intermediate articulated part Z can in general also be designed as a one-piece shaft section.

The stop device can be designed in various ways, and in particular with a stop lever. The stop device can be provided on only one adjustment mechanism, on a plurality of adjustment mechanisms, or on all adjustment mechanisms, of an adjustment device 10. FIGS. 10 and 11 represent in each case an example of embodiment of the stop device in accordance with the invention, wherein these examples of embodiment of the stop device represented act between the first 11 and a second 12 adjustment lever, so that the lines of action of the same, W11 or W12 respectively, run at an angle alpha (α) relative to one another in the maximum extended setting, which defines the stop device. In this case the line of action of the first adjustment lever or the second adjustment lever 12, 22 is to be understood as the connecting line between the first axis A11, A21 and the third axis A13, A23, or between the third axis A12, A22 and the second axis A12, A22, respectively.

FIG. 10 shows a representation in cross-section of an example of embodiment of a stop device 60 in terms of the first adjustment mechanism 10a, wherein the features of this example of embodiment can be provided alternatively or additionally on the second adjustment mechanism 10b. In the example of embodiment represented the stop lever is provided on the adjustment mechanism such that this acts between the first adjustment lever 11 and the second adjustment lever 12. For this purpose in the example of embodiment represented a stop lever 16 is arranged on the first adjustment lever 11.

The stop lever 61 is constituted in one piece with the first adjustment lever 11 and as an extension of the same in the direction towards the second axis A2. The free end 62 of the stop lever 61 is provided to make contact with the upper face 12a of the second adjustment lever 12 when the extended setting of the high-lift flap K is a maximum, i.e. when the high-lift flap K is located in its maximum extended setting. A bearing surface device, in particular in the form of a bearing plate 63, can be provided as an opposing surface on the second adjustment lever 12, with which the stop lever 61 makes contact when the adjustment mechanism 10a is located in the maximum extended setting, Alternatively or additionally to this form of embodiment a stop lever 16 can also be arranged on the second adjustment lever 12. Here the features ensue in an analogous manner to the previously described example of embodiment in which the stop lever is arranged on the first adjustment lever 11.

Alternatively or additionally to this the stop device 60, 70 can be embodied with a stop lever 61, 71 to limit the maximum extended setting of the high-lift flap K such that this acts between the high-lift flap K and the second adjustment lever 12, 22, and/or between the main wing surface H and the first adjustment lever 11, 21.

In the first alternative cited the stop lever 61, 71 is constituted in one piece with the second adjustment lever 12, 22, or with a fitting on the high-lift flap K, and as an extension of the same in the direction towards the fitting on the high-lift flap K, or towards the third articulation 13, 23, and is configured such that the free end 62, 72 of the stop lever 61, 71 can be brought into a stop setting with the fitting on the high-lift flap K, or the second adjustment lever 12, 22, so as to define the maximum extended setting of the respective adjustment mechanism 10a, 10b.

In the second alternative cited the stop lever 61, 71 is constituted in one piece with the respective first adjustment lever 11, 21, or with a fitting on the main wing surface H, and as an extension of the same in the direction towards the fitting on the main wing surface H, or towards the third articulation 13, 23, and is configured such that the free end 62, 72 of the stop lever 61, 71 can be brought into a stop setting with the fitting on the main wing surface H or the first adjustment lever 11, 21, so as to define the maximum extended setting of the respective adjustment mechanism 10a, 10b.

In accordance with the invention the stop device can be configured such that the stop device 60, 70 limits a maximum extended setting of the leading edge flap, in which the action directions W11, W12 of the adjustment lever have an angle (alpha) relative to one another of less than 180 degrees and e.g. a maximum of 179 degrees.

In general the stop lever 61 can be provided with a spring device 65, which in particular can be designed as a tapering of the cross-section of the stop lever 61. In the example of embodiment in accordance with FIG. 3 it is thereby achieved that in the phase in which the adjustment device 10 attains its maximum extended setting, e.g. in that the free end of the stop lever 61 makes contact with the second adjustment lever or the bearing plate 63 of the same, the stop moments and forces that thereby arise are accommodated by the stop lever 61 in a sprung manner. By this means the stop of the adjustment lever 11, 12 when attaining the maximum extended setting of the adjustment device or the respective adjustment mechanism is provided with a sprung accommodation path and the stop forces are minimised. In this manner the maximum forces occurring as the stop attains the maximum extended setting can be reduced and the dimensions of the structure can be optimised.

Alternatively or additionally the spring device can also be constituted by means of a spring device 75 (FIG. 11) acting between the first adjustment lever or the second adjustment lever, as provided in the example of embodiment represented in FIG. 11. If the stop device 60, 70 to limit the maximum extended setting of the high-lift flap K is to be embodied such that this acts between the high-lift flap K and the second adjustment lever 12, 22, and/or between the main wing surface H and the first adjustment lever 11, 21, a spring device in accordance with FIG. 11 can also be arranged in an analogous manner on the main wing surface 10, or on the high-lift flap K.

The spring device is arranged and embodied such that this exerts a restoring force onto the respective adjustment mechanism, i.e. onto the lever of the adjustment mechanism, by means of which the adjustment mechanism, i.e. the lever of the adjustment mechanism, is moved into its retracted setting. The spring device can also be provided and embodied to exercise the function of cushioning the respective adjustment mechanism as it arrives at the maximum extended setting.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. A wing comprising a main wing surface, a high-lift flap, which is arranged on the wing such that it can be moved by means of at least two adjustment mechanisms arranged side-by-side in the spanwise direction of the main wing surface and adjustable by means of a drive device, each of the adjustment mechanisms having:
   a first adjustment lever, which is articulated on the main wing surface via a first pivotal articulation, with the formation of a first axis of rotation,
   a second adjustment lever, which is articulated on the high-lift flap via a second pivotal articulation, with the formation of a second axis of rotation,
   a central articulation, which links together the first and the second adjustment levers, with the formation of a third axis of rotation, wherein
   the first, second and third axes of rotation pass through a common pole, which is fixed while the high-lift flap is adjusted with reference to the location of the main wing surface, wherein
   characterised in that on at least one of the adjustment mechanisms an intermediate articulated part with a base body, and at least one first and one second shaft mounting spaced apart in the transverse direction of the base body, is arranged and designed such that two shaft elements running in the longitudinal direction of the base body, spaced apart from one another in the transverse direction of the base body, are accommodated such that they can rotate,
   wherein the intermediate articulated part with the first shaft mounting supports a first shaft element with the formation of the first axis of rotation such that it can rotate, and with the second shaft mounting supports a fourth shaft element with the formation of a fourth axis of rotation such that it can rotate, for purposes of coupling the first adjustment lever and the main wing surface to the intermediate articulated part, with an axial separation distance between the first axis of rotation, and the fourth axis, or wherein
   the intermediate articulated part, with the first shaft mounting supports a second shaft element with the formation of the second axis of rotation such that it can rotate, and with the second shaft mounting supports a fourth shaft element with the formation of a fourth axis of rotation such that it can rotate, for purposes of coupling the second adjustment lever and the high-lift flap to the intermediate articulated part, with an axial separation distance between the first axis of rotation and the fourth axis.

2. The wing in accordance with claim 1, wherein the base body is constituted in one piece.

3. The wing in accordance with claim 1, wherein the base body is constituted in two pieces from two intermediate levers, wherein each of the two intermediate levers has a pair of shaft mountings.

4. The wing in accordance with claim 1, wherein intermediate articulated part is designed such that the first axis of rotation and the fourth axis of rotation, or the second axis of rotation and the fourth axis of rotation respectively, in each case run parallel to one another.

5. The wing in accordance with claim 1, wherein the intermediate articulated part is constituted from a base body and arranged thereupon two pairs of shaft mountings, in each case with a first and a second shaft mounting, in each case for purposes of forming a pivotal bearing with an axis, wherein the first shaft mounting respectively accommodates a shaft element such that it can rotate to form the first axis of rotation or the second axis of rotation, and wherein the second shaft mounting respectively accommodates shaft elements such that they can rotate to form the fourth axis of rotation respectively, and the first and the second shaft mounting in each case of a pair of shaft mountings are spaced apart from one another in the transverse direction of the intermediate articulated part to form the axial separation distance between the respective axes of rotation.

6. The wing in accordance with claim 5, wherein the shaft mountings of the intermediate articulated part (Z) are arranged displaced relative to one another in the longitudinal direction of the intermediate articulated part.

7. The wing in accordance with claim 1, wherein the base body of the intermediate articulated part is constituted from two intermediate levers extending in the transverse direction, wherein the first intermediate lever has a pair of shaft mountings with a first and a second shaft mounting, in each case designed as a spherical bearing, in each case to accommodate a shaft section, in order to couple the intermediate articulated part at a first end to the high-lift flap or the main wing surface, and at a second end to the first adjustment lever or the second adjustment lever, and wherein the second intermediate lever at the first end is connected such that it cannot rotate with the high-lift flap or the main wing surface, and at the second end has a shaft mounting designed as a spherical bearing, with which the second end of the second intermediate lever is coupled with a shaft section of the first adjustment lever or the second adjustment lever.

8. The wing in accordance with claim 1, wherein the base body of the intermediate articulated part is constituted from two intermediate levers extending in the transverse direction, wherein the first intermediate lever has a pair of shaft mountings with a first and a second shaft mounting, in each case designed as a spherical bearing, in each case to accommodate a shaft section, in order to couple the intermediate articulated part at a first end to the first adjustment lever or the second adjustment lever, and at a second end to the high-lift flap or the main wing surface, and wherein the second intermediate lever at the first end is connected such that it cannot rotate with the first adjustment lever or the second adjustment lever, and at the second end has a shaft mounting designed as a spherical bearing, with which the second end of the second intermediate lever is coupled with a shaft section of the high-lift flap or the main wing surface.

9. The wing in accordance with claim 1, wherein the base body of the intermediate articulated part is constituted from two intermediate levers extending in the transverse direction, wherein the first intermediate lever has shaft mountings, spaced apart from one another in the transverse direction, with a first and a second shaft mounting, in each case designed as a spherical bearing, in each case to accommodate a shaft section such that it can rotate, wherein the intermediate articulated part at a first end is coupled with a shaft section of the high-lift flap or a shaft section of the main wing surface, and at a second end is coupled with a shaft section of the first adjustment lever or the second adjustment lever, and wherein the second intermediate lever has a pair of shaft mountings, spaced apart from one another in the transverse direction, with at least one first shaft mounting designed as a spherical bearing, and with at least one second shaft mounting designed as a non-spherical bearing, in each case to accommodate a shaft section such that it can rotate, wherein the intermediate articulated part at a first end is coupled with a shaft section of the high-lift flap or a shaft section of the main wing surface, and at a second end is coupled with a shaft section of the first adjustment lever or the second adjustment lever.

10. The wing in accordance with claim 9, wherein the second intermediate lever of the intermediate articulated part has shaft mountings spaced apart from one another in the transverse direction, with a first shaft mounting and two second shaft mountings, which in each case are designed as non-spherical bearings and to accommodate a shaft section such that it can rotate, wherein the intermediate articulated part at a first end is coupled with a shaft section of the high-lift flap or a shaft section of the main wing surface, and at a second end is coupled with a shaft section of the first adjustment lever or the second adjustment lever.

11. The wing in accordance with claim 9, wherein the second intermediate lever of the intermediate articulated part has shaft mountings spaced apart from one another in the transverse direction, with two first shaft mountings and one second shaft mounting, which in each case are designed as non-spherical bearings and to accommodate a shaft section such that it can rotate, wherein the intermediate articulated part at a first end is coupled with a shaft section of the high-lift flap or a shaft section of the main wing surface, and at a second end is coupled with a shaft section of the first adjustment lever or the second adjustment lever.

12. The wing in accordance with claim 1, wherein the high-lift flap is a leading-edge flap.

13. The wing in accordance with claim 12, wherein the leading-edge flap is a Krüger flap, which in its retracted setting lies against the underside of the main wing surface.

14. The wing in accordance with claim 12, wherein the leading-edge flap is a slat.

15. The wing in accordance with claim 1, wherein the high-lift flap is a trailing-edge flap.

16. The wing in accordance with claim 1, wherein the drive device is constituted from a linear drive.

17. The wing in accordance with claim 1, wherein the drive device is constituted from a rotary drive.

18. The wing in accordance with claim 1, wherein the wing has a stop device for purposes of limiting the maximum extended setting of the high-lift flap, and wherein the stop device is constituted with a stop lever acting between the first and the second adjustment lever, which is constituted in one piece with the first adjustment lever, or with the second adjustment lever, and as an extension of the same in the direction towards the second axis, or the first axis, and which is configured such that the free end of the stop lever can be brought into a stop setting with a bearing surface device on the second adjustment lever, or on the first adjustment lever so as to define the maximum extended setting of the respective adjustment mechanism.

19. The wing in accordance with claim 1, wherein the wing has a stop device for purposes of limiting the maximum extended setting of the high-lift flap, and wherein the stop device is constituted with a stop lever to limit the maximum extended setting of the high-lift flap, which is constituted in one piece with the first adjustment lever, or with a fitting on the main wing surface, and as an extension of the same in the direction towards the fitting on the main wing surface, or towards the third articulation, and is configured such that the free end of the stop lever can be brought into a stop setting with the fitting on the main wing surface, or the first adjustment lever so as to define the maximum extended setting of the respective adjustment mechanism.

20. The wing in accordance with claim 1, wherein the wing has a stop device for purposes of limiting the maximum extended setting of the high-lift flap, and wherein the stop device is constituted with a stop lever to limit the maximum extended setting of the high-lift flap, which is constituted in one piece with the second adjustment lever, or with a fitting on the high-lift flap, and as an extension of the same in the direction towards the fitting on the high-lift flap, or towards the third articulation, and is configured such that the free end of the stop lever can be brought into a stop setting with the fitting on the high-lift flap, or the second adjustment lever, so as to define the maximum extended setting of the respective adjustment mechanism.

* * * * *